(12) United States Patent
McMurtrey (10) Patent No.: US 7,474,492 B2
(45) Date of Patent: Jan. 6, 2009

(54) MECHANICAL REFERENCE DETECTION USING A V-SHAPED PATTERN

(75) Inventor: Dave McMurtrey, Loveland, CO (US)

(73) Assignee: Maxtor Corporation, Scotts Valley, CA (US)

( * ) Notice: Subject to any disclaimer, the term of this patent is extended or adjusted under 35 U.S.C. 154(b) by 0 days.

(21) Appl. No.: 11/752,074

(22) Filed: May 22, 2007

(65) Prior Publication Data

US 2008/0013203 A1 Jan. 17, 2008

Related U.S. Application Data

(60) Provisional application No. 60/747,913, filed on May 22, 2006.

(51) Int. Cl.
*G11B 21/02* (2006.01)

(52) U.S. Cl. ....................................... 360/75

(58) Field of Classification Search .................. None
See application file for complete search history.

(56) References Cited

U.S. PATENT DOCUMENTS

| | | | | |
|---|---|---|---|---|
| 4,587,579 | A | * | 5/1986 | Cocke et al. ................. 360/75 |
| 5,003,412 | A | * | 3/1991 | Bizjak et al. ............. 360/77.01 |
| 5,570,247 | A | | 10/1996 | Brown et al. |
| 5,668,679 | A | * | 9/1997 | Swearingen et al. .......... 360/75 |
| 6,169,382 | B1 | | 1/2001 | McKenzie et al. |
| 6,396,652 | B1 | | 5/2002 | Kawachi et al. |
| 6,721,121 | B1 | | 4/2004 | Schreck et al. |
| 6,798,610 | B1 | | 9/2004 | Deng et al. |
| 6,922,302 | B2 | | 7/2005 | Kusumoto et al. |
| 7,031,093 | B2 | | 4/2006 | Suzuki |
| 7,164,552 | B2 | | 1/2007 | Yamamoto |
| 7,209,310 | B1 | | 4/2007 | Tsai et al. |
| 2006/0005403 | A1 | | 1/2006 | Calfee et al. |
| 2006/0044658 | A1 | | 3/2006 | Ma |

* cited by examiner

*Primary Examiner*—K. Wong
(74) *Attorney, Agent, or Firm*—Fellers, Snider, et al.

(57) ABSTRACT

Various embodiments of the present invention are generally directed to detecting a fixed mechanical reference adjacent a storage medium using a v-shaped pattern written to the medium.

20 Claims, 5 Drawing Sheets

OD LIMIT STOP

ID LIMIT STOP

MECHANICAL REFERENCE DETECTION USING A V-SHAPED PATTERN

RELATED APPLICATIONS

The present application makes a claim of domestic priority to U.S. Provisional Patent Application No. 60/747,913 filed May 22, 2006.

BACKGROUND

The present case is generally directed to detecting a fixed mechanical reference. Servo data are often used in a control system to provide feedback positional control for a control object. In the environment of a data storage device, such data can be used to detect and control the position of a read/write transducer adjacent a rotatable storage medium.

The servo data can be provided in a number of ways. In one approach, a servo track writer engages a data storage device to write an initial set of servo data to the storage media mounted therein. The initial servo data can take a number of forms, such as a series of spaced apart, continuous spirals that extend across the media surfaces in helical fashion from an outermost diameter (OD) to an innermost diameter (ID). Final servo data are thereafter written using the initial servo data as a prewritten positional reference.

SUMMARY

Various embodiments of the present invention are generally directed to detecting a fixed mechanical reference adjacent a storage medium using a v-shaped pattern written to the medium.

In accordance with some embodiments, a method comprises writing a v-shaped pattern to a storage medium, and reading the v-shaped pattern to determine a radial position of a fixed mechanical reference adjacent the medium.

In accordance with other embodiments, a data storage device comprises a controller configured to write a v-shaped pattern to a storage medium of the device, and to read the v-shaped pattern to determine a radial position of a fixed mechanical reference of the device adjacent the medium.

In accordance with still other embodiments, a data storage device comprises a fixed mechanical reference adjacent a storage medium; and first means for writing a v-shaped pattern to a storage medium, and for reading the v-shaped pattern to determine a radial position of the fixed mechanical reference with respect to the medium.

DETAILED DESCRIPTION

Figure 1:
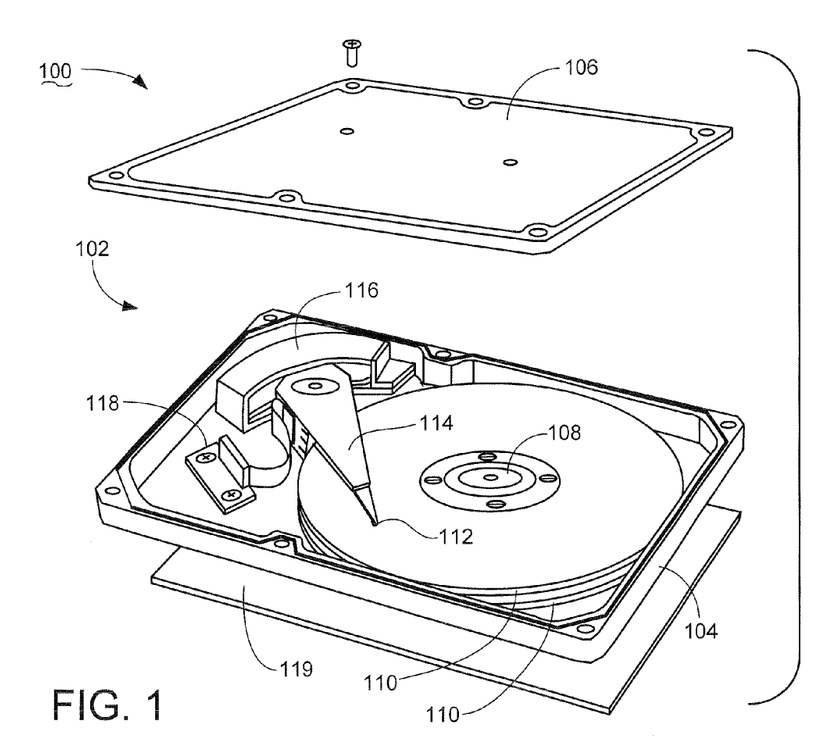
FIG. 1 shows an exemplary data storage device.

FIG. 1 generally illustrates a data storage device 100 to provide an exemplary environment in which various embodiments of the present invention can be advantageously practiced. The device 100 includes a housing 102 formed from a base deck 104 and top cover 106. An internally disposed spindle motor 108 is configured to rotate a number of storage media 110.

An array of read/write transducers (heads) 112 are supported adjacent the associated media surfaces by fluidic (e.g., air) currents established by the high speed rotation of the media 110. The transducers 112 access data tracks defined on the media surfaces to transfer data between the media 110 and a host device.

An actuator 114 moves the transducers 112 through application of current to a voice coil motor (VCM) 116. A flex circuit assembly 118 provides electrical communication paths between the actuator 112 and device control electronics on an externally disposed printed circuit board (PCB) 119.

Figure 2:
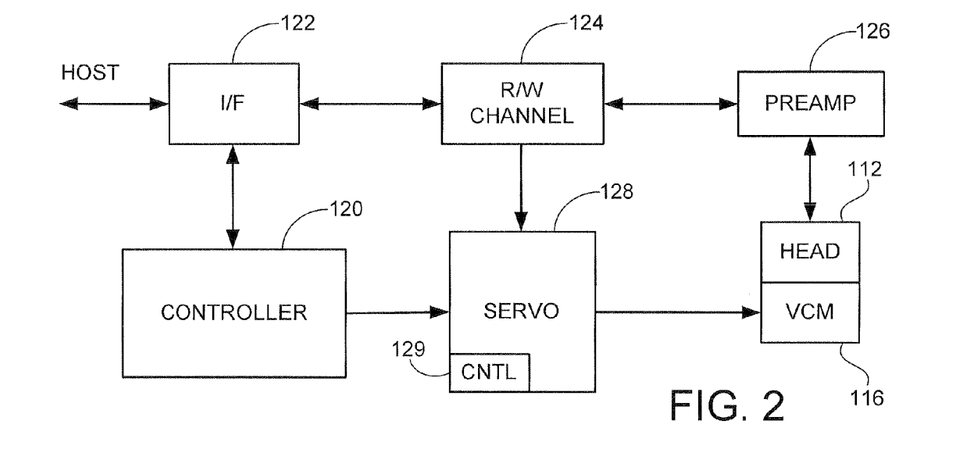
FIG. 2 provides a functional block diagram of the device of FIG. 1.

FIG. 2 provides a generalized functional block diagram of the device 100 of FIG. 1. A top level controller 120 provides overall control of the device 100 during operation. An interface (I/F) circuit 122 communicates with a host device (not shown) to facilitate data I/O operations in which user data are transferred between the media 110 and the host device.

A read/write (R/W) channel 124 conditions write data to be written to the media 110, and reconstructs previously stored data from readback signals transduced from the media 110. A preamplifier/driver circuit (preamp) 126 applies write currents to the associated transducer 112 during write operations, and applies read bias currents to the transducers 112 and readback signal preamplification during read operations.

A servo circuit 128 provides closed loop servo actuator control using embedded servo data on the respective media surfaces. The servo circuit 128 preferably includes a programmable servo controller 129 which operates under the direction of the top level controller 120.

The servo controller 129 generally operates in two primary modes, seeking and track following. Seeking generally involves controlled radial movement of a selected transducer 112 from an initial position to a final, destination position. Track following generally comprises operation of the servo controller 129 to maintain the selected transducer 112 over the center (or other commanded position) a selected track in order to carry out data accesses with the track.

Figure 3:
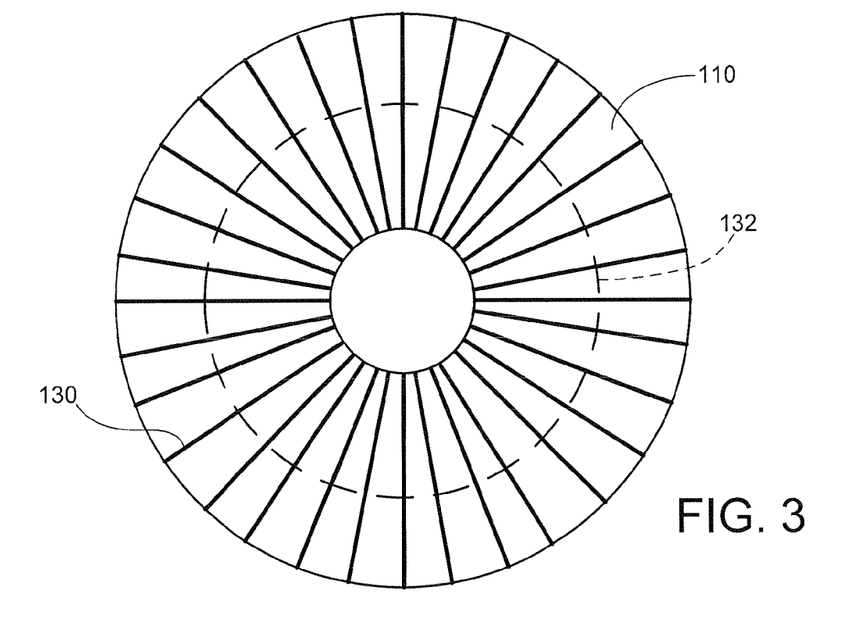
FIG. 3 generally illustrates exemplary final servo data on a storage medium of the device.

The embedded servo data are arranged on each recording surface as shown in FIG. 3. A series of spaced apart servo wedges 130 contiguously extend like spokes of a wheel from an outermost diameter (OD) to an innermost diameter (ID) of the recording surface. The servo wedges 130 define adjacent concentric servo data tracks on the media, such as generally represented at 132.

Each servo wedge 130 preferably includes synchronization, automatic gain control (AGC), header, track address (e.g., Grey code), and intra-track positional information (e.g., A-F dibit patterns). These respective fields are demodulated by the servo circuit 128 to control the positioning of the transducer 112 during I/O operations with user data sectors in the regions between adjacent servo wedges 130. The total number of servo wedges 130 will be selected in accordance with the requirements of a given application, and may be on the order of around 200 or more.

The final servo data shown in FIG. 3 are written during a self-servo write operation of the device 100, in which the device incrementally writes the final servo data using previously written coarse servo data as a reference. Such coarse servo data are exemplified by a servo spiral 134 in FIG. 4.

The servo spiral 134 extends from OD to ID and is written by advancing an associated transducer 112 radially across the medium 110 at a selected velocity while continuously streaming write data to the media surface. While only a single spiral is shown in FIG. 4, it is contemplated that a population of such spirals will be arranged in a spaced apart fashion around the medium, with the total number of spirals preferably equal to or greater than the total number of final servo wedges 130.

Figure 4:
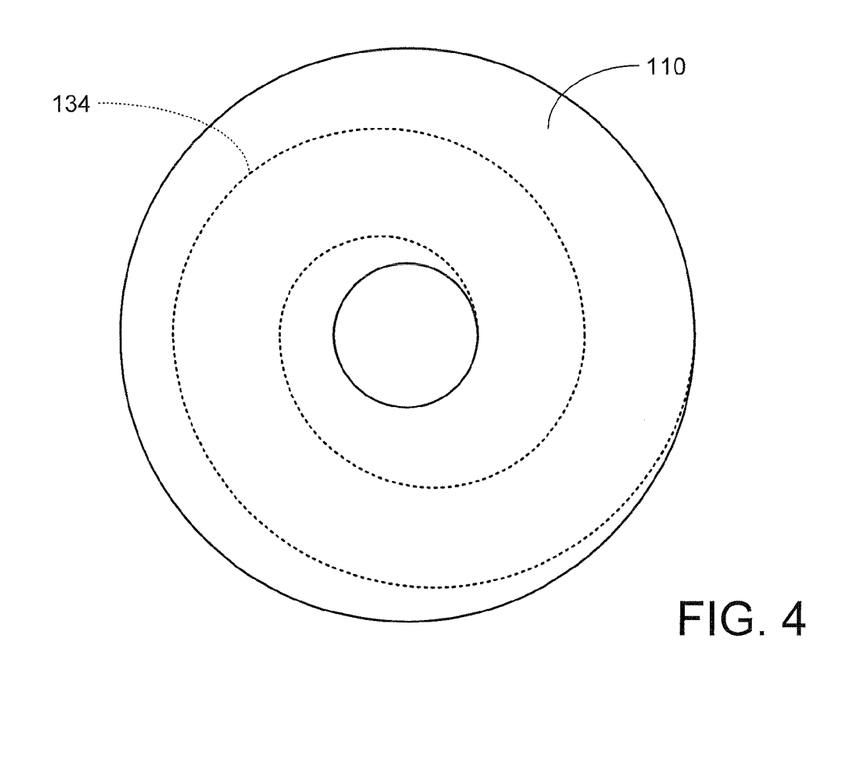
FIG. 4 shows an exemplary initial servo spiral pattern used as a reference during the writing of the final servo data of FIG. 3.

It is generally desirable that a known radial positional reference be determined during the writing of the coarse servo data of FIG. 4. This ensures that each successively added spiral is accurately located on the medium 110 in the desired location.

One way to maintain a known positional reference is through the use of an external mechanism, such as a servo-track writer (STW) coupled to the device 100. In such approach, the STW directs the writing of the coarse servo data by physically advancing the actuator 114 across the medium 110, while using a highly precise, closed loop position detection system (such as a laser inferometer, etc.) to provide feedback positional control. This ensures that each spiral 134 nominally begins and ends at the desired respective radii, and is properly spaced with respect to the other spirals on the medium.

While operable, the use of STWs or other external mechanisms to assist in the writing of the servo data can be expensive and can introduce process-flow bottlenecks in a high volume manufacturing environment. Accordingly, various embodiments of the present invention enable a device such as 100 to establish accurate positional references in an unassisted fashion, without the need for external intervention or control. A first approach for determining such position references will now be described beginning with FIG. 5.

Figures 5, 6:
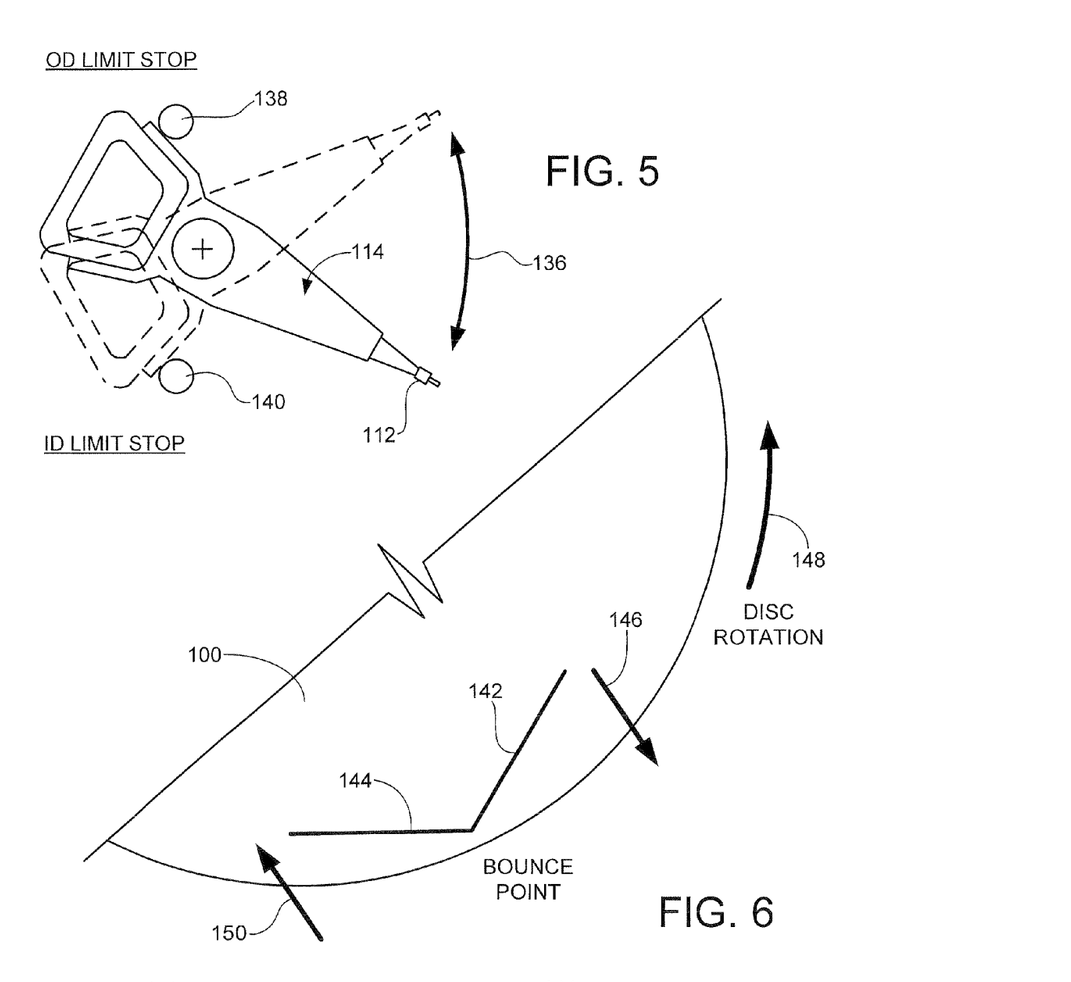
FIG. 5 depicts inner and outer limit (crash) stops for an actuator of the device of FIG. 1.
FIG. 6 provides first and second spiral servo segments written as the transducer is bounced against the outer limit stop of FIG. 5.

FIG. 5 generally represents the actuator 114 of FIG. 1 to denote an overall range of motion 136, or stroke, as the transducers 112 are moved adjacent the associated media surfaces. As can be seen from FIG. 5, the stroke is bounded at the outermost diameter (OD) of the media by a first limit (crash) stop 138, and bounded at the innermost diameter (ID) of the media by a second limit stop 140. The respective limit stops 138, 140 can take any number of forms, such as a vertically depending shaft encapsulated with a suitable damping elastomer.

The limit stops 138, 140 protect against damage to the device 100 by preventing passage of the transducers 112 beyond the OD of the media 110, as well as by preventing damaging contact of the transducers 112 with structure associated with the spindle motor 108 at the ID (e.g., media spacers, disc clamp, hub features, etc.). Moreover, the limit stops 138, 140 (or corresponding features on the actuator 114) are sufficiently compliant to protect against damage should the actuator inadvertently slam into a selected stop at a high velocity during a runaway (loss of control) condition.

While intentional contact with the limit stops 138, 140 is largely avoided during normal device I/O operations, some embodiments of the present invention take advantage of the compliant nature of the actuator/limit stop interface by intentionally bouncing the transducer 112 off of the limit stop while servo data are written to the corresponding media surface.

FIG. 6 shows exemplary first and second spiral servo segments 142, 144 written in this manner, using the OD limit stop 138 of FIG. 5. The segments 142, 144 can take a variety of forms, but it is contemplated that the segments will have a pattern format nominally similar to the coarse spiral signal 134 of FIG. 4.

The first segment 142 is preferably generated by initiating a seek to sweep the associated transducer 112 in a direction toward the OD (directional arrow 146) at a relatively low, selected radial velocity. During this movement of the transducer 112, a write gate is asserted by the channel 124 (FIG. 2) to initiate the writing of the associated servo data across the medium 110.

The direction of media rotation is indicated by arrow 148, so that the relative movement of the transducer 112 and medium 110 generally result in the first segment being angled with respect to the medium, as shown. While the segment 142 is depicted as being substantially linear in FIG. 6, it will be appreciated that the segment may tend to take a more curvilinear shape.

The segment 142 will continue to be written outwardly until such time that the actuator 114 reaches the fixed mechanical reference of the OD limit stop 138 (FIG. 5). At this point the transducer 112 is bounced, or deflected, away from the OD of the medium 110 and begins moving toward the ID (arrow 150). Because the transducer 112 continuously writes data over this interval, the inward movement of the transducer results in the writing of the second segment 144 from the impact point.

The initial inward velocity of the transducer 112 is preferably selected to be high enough to ensure sufficient kinetic energy is available to induce the desired outward movement of the transducer after the impact event, without being too high to cause damage to the transducer 112. A short acceleration pulse can be applied to initiate the inward movement, after which the transducer 112 coasts to the limit stop and bounces off again. A second deceleration pulse can be thereafter applied to halt further radial motion at the end of the writing of the second segment. The seek profile can be tuned for a given device design or otherwise adaptively adjusted, as required.

Figure 7:
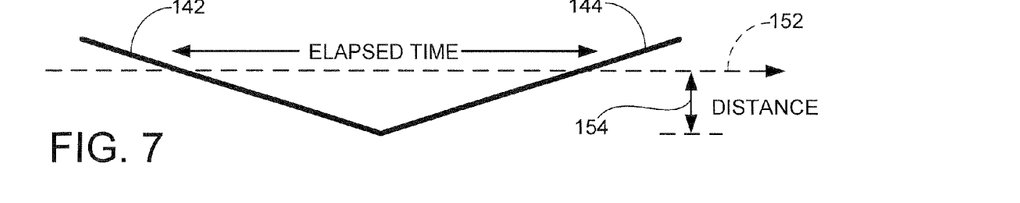
FIG. 7 shows the segments of FIG. 6 in greater detail.

As further shown in FIG. 7, the resulting segments 142, 144 form a substantially v-shaped pattern with an intersection (cross-over) point substantially at the fixed mechanical reference of the associated limit stop. Additional v-shaped patterns can be written to the medium in spaced apart fashion around the circumference of the medium 110 using the same nominal seek profile.

The transducer 112 is subsequently positioned near the associated limit stop so as to detect the respective segments (legs) of the v-shaped pattern, as indicated by broken line path 152 in FIG. 7. The elapsed time between the detection of the first segment 142 and the detection of the second segment 144 will be directly proportional to the radial distance from the fixed mechanical reference (distance 154); that is, the time between legs will decrease the closer the transducer 112 is to the limit stop, and the time between legs will increase the farther away the transducer is from the limit stop.

The servo controller 129 (FIG. 2) uses the v-patterns to accurately position the transducer 112 at a known radial distance from the fixed mechanical reference, and initiates the writing of each coarse spiral 134 in turn from this radial reference position. As desired, a continuous circumferentially extending servo track can be written at this radius to provide both position and timing references for the servo data. This servo track can be written while serving off of the v-shaped patterns. While the v-shaped patterns of FIGS. 6-7 are generated adjacent the OD, similar v-shaped patterns and servo tracks can be written adjacent the ID as well.

The dual limit stop embodiments of FIGS. 5-7 facilitate the use of a contact start-stop (CSS) methodology to park the transducers 112 when the device 100 is deactivated, by bringing the transducers in to land on laser texturized landing zones such as near the ID.

Figure 8:
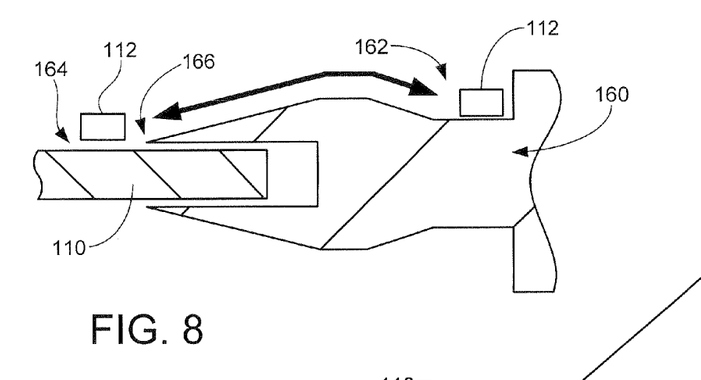
FIG. 8 is a cross-sectional, elevational representation of a ramp structure of the device of FIG. 1 in accordance with an alternative embodiment.

Alternative embodiments, however, utilize a separate ramp structure to park the transducers 112. As shown in FIG. 8, an exemplary ramp structure 160 is located adjacent to, and slightly overlaps, the OD of each medium 110. This enables the transducers 112 to be unloaded from the media 110 to a parked position 162 beyond the OD of the media 110 when the device is deactivated. Upon reactivation, the transducers 112 are loaded onto the media surfaces (position 164) once the velocity of the spindle motor 108 (FIG. 1) is increased sufficiently to support transducer flight.

It will be appreciated that the configuration of FIG. 8 uses the ID limit stop 140 as an innermost fixed mechanical reference, as before. The overall stroke 136 of the actuator 114 is extended, however, to enable passage of the transducers 112 to the parked position 162 beyond the OD of the media 110. An entry point (leading edge) 166 of the ramp structure 160 serves as an outermost fixed mechanical reference, since data cannot generally be written to the media 110 beyond this point.

Figure 9:
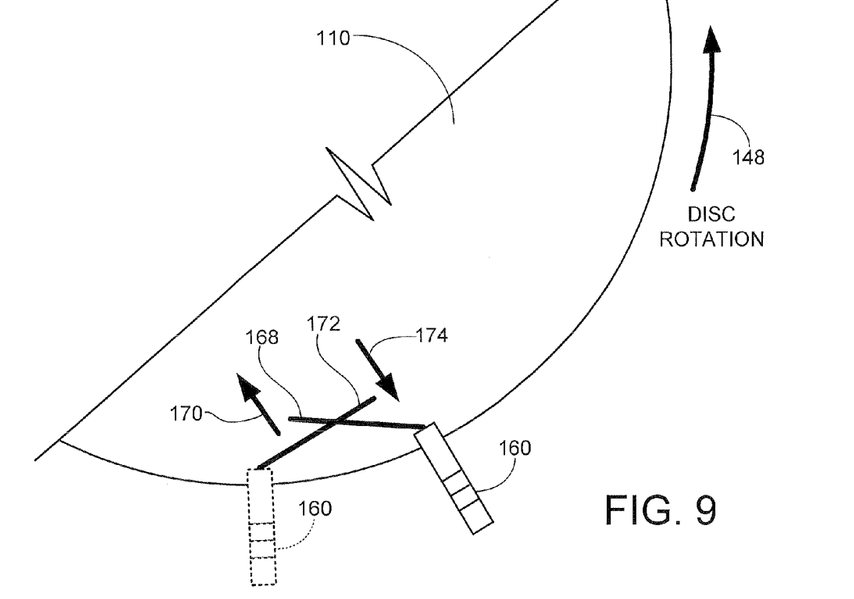
FIG. 9 provides first and second spiral servo segments written as the transducer is moved relative to the ramp structure of FIG. 8.

The edge 166 of the ramp can be detected as set forth in FIG. 9. The transducer 112 is initially parked on the ramp structure 160 at the unloaded position 162 (FIG. 8). A relatively low velocity seek is next commanded to sweep the transducer 112 across the ramp structure 160 and toward the medium 110.

As the transducer 112 advances along the ramp structure 160, a write gate is asserted so that write currents are supplied to the transducer 112, preferably while the transducer 112 remains supported by the ramp structure 160. It will be noted that the ramp structure 160 is preferably formed of a suitable nonmagnetic material such as plastic, so that the initially applied write currents do not result in the recording of data, but do not result in damage to the transducer 112 or the ramp structure 160 either.

However, once the transducer 112 passes the leading edge 166 and becomes loaded onto the medium 110, the write currents will result in the generation of a first spiral servo segment 168 which extends away from the leading edge 166, as generally depicted in FIG. 9. As before, the segment 168 is depicted in linear fashion, but may take a more curvilinear shape depending on the rate of disc rotation 148 and radial velocity of the transducer 112. The inward direction of movement during this stage is generally denoted by arrow 170, and such movement continues until an appropriate distance away from the edge 166 is reached.

The transducer 112 is next positioned at an appropriate radial location over a medial portion of the medium 110. This position can be selected by servoing on and locating the distal end of the first segment 168. An outwardly directed seek is thereafter initiated to write a second spiral servo segment 172 in direction 174, with the second segment 172 intersecting the first segment 168. Timing adjustments and/or multiple passes may be required to ensure the second segment 172 congruently meets the first segment 168.

For clarity, a second ramp structure 160 is shown in broken line fashion in FIG. 9. This is the same ramp structure as before, and is merely provided to denote the angular offset that will occur as a result of the continued rotation of the medium 110. It is noted that the radial stroke path of the actuator 114 remains radially aligned with the ramp structure 160 at all times, and the media 110 rotates adjacent these components.

Figure 10:
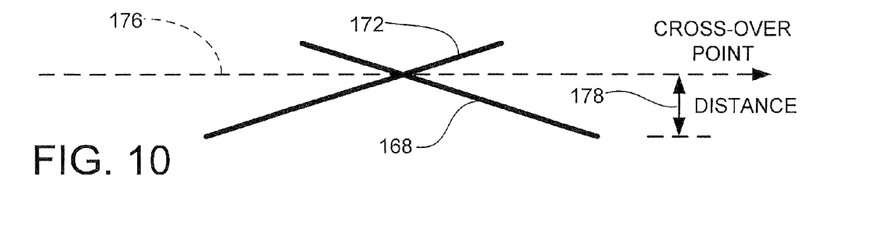
FIG. 10 shows the segments of FIG. 9 in greater detail.

As further shown in FIG. 10, the second segment 172 crosses the first segment 168 along a medial portion of the first segment. This results in a generally x-shaped pattern, which for purposes herein is also characterized as a v-shaped pattern since an x-shape necessarily comprises two opposing v-shapes.

A single x-shaped pattern can be used, or multiple such patterns can be written in a spaced apart fashion around the circumference of the medium 110, as before. As set forth by FIG. 10, the transducer 112 is subsequently positioned with respect to a selected x-shaped pattern, and the elapsed time between respective segments 168, 172 is measured. It will be appreciated that as the transducer 112 is slowly advanced toward the ramp structure 160 across the pattern, the respective segments 168, 172 will get increasingly closer together until the cross-over point is detected, after which the segments will get increasingly farther apart until the edge 166 of the ramp structure 160 is reached. That is, detection of one or both of the segments 168, 172 will cease as the transducer passes the leading edge 166 and moves up onto the ramp structure 160.

The radial distance between the cross-over point and the edge 166 can therefore be readily determined, such as by integrating velocity as the transducer 112 is moved between these respective points. This provides an accurate measure of the actual physical location of the fixed mechanical reference of the ramp leading edge 166 (distance 178 in FIG. 10).

Thereafter, this known reference point can be used to write servo data to the medium 110, as before. Due to timing drift and other effects, the cross-over point for each x-shaped pattern of FIGS. 9-10 may each be at a slightly different radius, unlike the cross-over points (bounce points) for the v-shaped patterns of FIGS. 6-7 which are contemplated at being at nominally the same common radius. If so, the intervening distances 178 for each x-shaped pattern can be individually determined and combined to provide an overall servo reference, such as through the use of repeated runout (RRO) compensation techniques.

Figure 11:
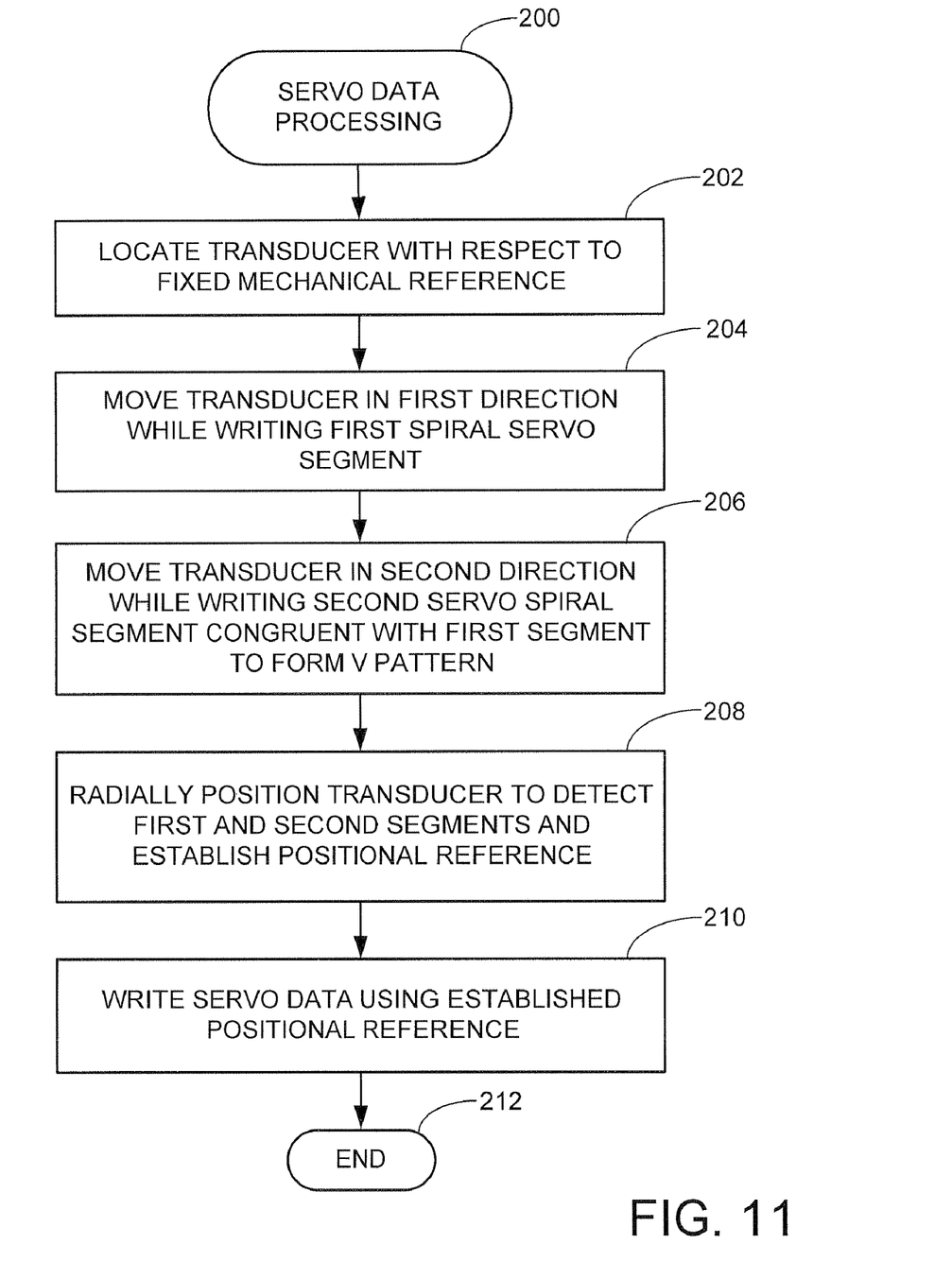
FIG. 11 is a flow chart for a SERVO DATA PROCESSING routine, generally illustrative of steps carried out in accordance with various embodiments of the present invention

The foregoing embodiments are summarized by a SERVO DATA PROCESSING routine 200 set forth in FIG. 11. At step 202, a selected transducer 112 is located with respect to an associated fixed mechanical reference. When a bounce methodology is used, this may result in the positioning of the transducer 112 over a medial portion of the medium 110 such as described above in FIG. 6. When a cross-over methodology is used, this may result in the positioning of the transducer 112 onto a ramp structure such as 160 in FIG. 8.

At step 204, the transducer 112 is selectively moved in a first direction while writing a first spiral servo segment to the medium 110. This is exemplified by first servo segment 142 in FIG. 6 and by first servo segment 168 in FIG. 9.

At step 206, the transducer 112 is moved in a second direction opposite the first direction while writing a second spiral servo segment that is congruent with the first spiral servo segment to form a v-shaped pattern therebetween. In the embodiments of FIGS. 5-7, step 206 commences upon contact with the associated limit stop 138 and the resulting bouncing away of the transducer 112 therefrom during which the second spiral servo segment 144 is written.

Conversely, in the embodiments of FIGS. 8-10, step 206 commences with the positioning of the transducer 112 over a medial portion of the medium 110, followed by the timing of an OD directed seek to write the second spiral servo segment 172 to cross-over the first segment 168.

Continuing with FIG. 11, at step 208 the transducer 112 is radially positioned to detect the first and second segments to identify a radial positional reference that is a known distance from the fixed mechanical reference point. This step is carried out in accordance with the previous discussion of FIGS. 7 and 10, respectively. It will be noted that in each case, the end of the segments directly correspond to the fixed mechanical reference location.

Although not specifically depicted in the flow chart of FIG. 11, steps 202 through 208 are preferably repeated to provide identified radial position references at both the OD and the ID.

Final servo data are thereafter written to the medium 110 at step 210 based on the identified radial position references of step 208. As described hereinabove, the writing of servo data during step 210 is preferably carried out during a self-servo writing operation. In some approaches, the device 100 generates the desired number of servo spirals (e.g., 134 in FIG. 4) and then incrementally moves across the medium to write the final servo data (e.g., 130 in FIG. 3).

It is contemplated that circumferentially extending servo tracks are written at both the ID and OD of the recording surface using the routine of FIG. 11. A spiral seek profile can first be adaptively tuned to consistently begin at one reference and end at the other, after which the seek profile can be repetitively used to write the spiral patterns 134 shown in FIG. 4.

Preferably, the spiral patterns are written to only a single media surface, after which the controller 120 (FIG. 2) bank writes the final servo data to all of the media surfaces. That is, one transducer 112 will transduce the coarse servo data 134 to provide overall actuator position, and write commands will be simultaneously issued to all of the transducers to write the final servo data 130 (FIG. 3) on all of the media surfaces at the same time. This saves processing time, as well as improves surface-to-surface alignment of the resulting servo data. Once the final servo data have been written, the process ends at step 212.

For purposes of the appended claims, the recited first means will be understood to correspond to the data storage device controller 120 which operates in accordance with the routine of FIG. 11 during a self-servo write operation without use of an external mechanism such as an STW.

It will be understood that even though numerous characteristics and advantages of various embodiments of the invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A method comprising writing a v-shaped pattern to a storage medium by continuously moving a transducer in a first radial direction while writing a first segment of the v-shaped pattern and by continuously moving the transducer in an opposing second radial direction while writing a second segment of the v-shaped pattern, and reading the v-shaped pattern to determine a radial position of a fixed mechanical reference adjacent the medium.

2. The method of claim 1, wherein the writing step comprises bouncing a the transducer off of a limit stop while writing the v-shaped pattern.

3. The method of claim 2, wherein the v-shaped pattern comprises congruent first and second spiral servo segments, the first spiral servo segment written while the transducer approaches the limit stop and the second spiral servo segment written as the transducer moves away from the limit stop.

4. The method of claim 1, wherein the writing step comprises writing a first segment of the v-shaped pattern during movement of the transducer off of a ramp structure toward the storage medium.

5. The method of claim 4, wherein the writing step subsequently comprises writing a second segment of the v-shaped pattern while moving the transducer toward the ramp structure.

6. The method of claim 1, wherein the radial position of the fixed mechanical reference is determined in relation to an elapsed time detected between opposing segments of the v-shaped pattern.

7. The method of claim 1, wherein the v-shaped pattern is formed from first and second spiral servo segments that cross to form an overall x-shaped pattern of which the v-shaped pattern forms a part.

8. The method of claim 7, wherein the determined radial position is identified in relation to a detected radial position of a cross-over point at which said first and second spiral servo segments cross.

9. The method of claim 1, further comprising writing servo data to the storage medium in relation to the determined radial position of the reading step, the servo data used by a servo circuit to controllably position a transducer adjacent the storage medium.

10. The method of claim 1, wherein the storage medium and the fixed mechanical reference form respective portions of a data storage device.

11. A data storage device comprising a controller configured to position a read/write transducer to write a v-shaped pattern to a storage medium of the device, and to position the transducer to read the v-shaped pattern to determine a radial position of a fixed mechanical reference of the device adjacent the medium, wherein the v-shaped pattern is written by continuously moving a transducer in a first radial direction while writing a first segment of the v-shaped pattern and by continuously moving the transducer in an opposing second radial direction while writing a second segment of the v-shaped pattern.

12. The data storage device of claim 11, wherein the fixed mechanical reference is characterized as a limit stop which limits an overall stroke length of an actuator which supports the transducer adjacent the storage medium, and wherein the v-shaped pattern is written while the transducer is bounced against the limit stop.

13. The data storage device of claim 11, wherein the fixed mechanical reference is characterized as a ramp structure, and wherein a portion of the v-shaped pattern is written while the transducer is moved in a first radial direction from an unloaded position on the ramp structure to a loaded position adjacent the storage medium.

14. The data storage device of claim 13, wherein a second portion of the v-shaped pattern is written while the transducer is subsequently moved toward the unloaded position, the second portion crossing over the first portion to form an x-shaped pattern of which the v-shaped pattern forms a part.

15. The data storage device of claim 11, wherein the v-shaped pattern comprises congruent first and second spiral servo segments that physically terminate at the fixed mechanical reference.

16. The apparatus of claim 11, wherein the radial position of the fixed mechanical reference is determined in relation to an elapsed time detected between opposing segments of the v-shaped pattern.

17. A method comprising bouncing an actuator off of a limit stop, and using a transducer supported by the actuator to continuously write a v-shaped pattern to a data storage surface during the bouncing step.

18. The method of claim 17, wherein the bouncing step comprises applying an impulse to initiate movement of the actuator in a first radial direction toward the limit stop, wherein the actuator subsequently initiates movement in an opposing second radial direction responsive to contacting engagement with the limit stop, and wherein the transducer continuously writes the v-shaped pattern as the actuator moves in the respective first and second radial directions.

19. The method of claim 17, further comprising a step of using the transducer to read the v-shaped pattern to determine a radial position of the transducer with respect to the limit stop.

20. The method of claim 19, wherein the radial position of the transducer is used to control a writing of servo data to the storage surface by the transducer.

* * * * *

UNITED STATES PATENT AND TRADEMARK OFFICE
CERTIFICATE OF CORRECTION

PATENT NO. : 7,474,492 B2
APPLICATION NO. : 11/752074
DATED : January 6, 2009
INVENTOR(S) : Dave McMurtrey

Page 1 of 1

It is certified that error appears in the above-identified patent and that said Letters Patent is hereby corrected as shown below:

In Col. 8, line 2
replace "bouncing a the"
with "bouncing the."

Signed and Sealed this

Twenty-fourth Day of March, 2009

JOHN DOLL
*Acting Director of the United States Patent and Trademark Office*